July 19, 1932. H. A. HIDDE NIJLAND 1,867,944
APPARATUS FOR INDICATING THE PRESENCE OF POTENTIAL OR
CURRENT IN A CABLE OR OTHER METALLIC CONDUCTOR
Filed Nov. 27, 1928
Fig:1.
Fig:2.
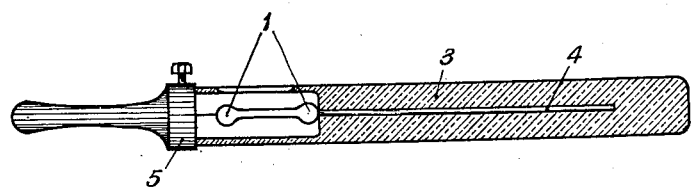
Fig:3.
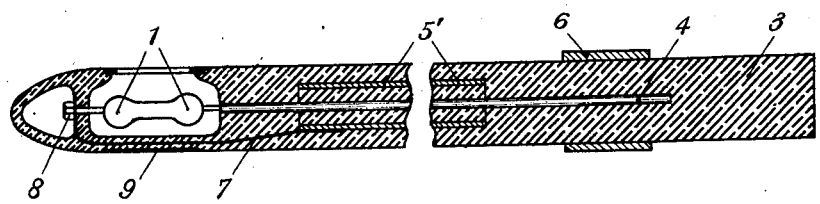

Patented July 19, 1932

1,867,944

UNITED STATES PATENT OFFICE

HENDRIK AREND HIDDE NIJLAND, OF ZEIST, NETHERLANDS, ASSIGNOR TO NAAM-LOOZE VENNOOTSCHAP ELECTRO-APPARATEN-FABRIEKEN SYSTEEM COQ, OF UTRECHT, NETHERLANDS, A LIMITED LIABILITY COMPANY OF THE NETHERLANDS

APPARATUS FOR INDICATING THE PRESENCE OF POTENTIAL OR CURRENT IN A CABLE OR OTHER METALLIC CONDUCTOR

Application filed November 27, 1928, Serial No. 322,262, and in the Netherlands December 10, 1927.

This invention has relation to a method and an apparatus for testing electrically charged cables or other conductors and has for an object a method for the purpose of indicating the presence of potential or electric current in a cable or other metallic conductor.

Another object of the invention is to provide a very inexpensive simple and handy portable apparatus intended primarily for use in power stations, transformer stations or other points of distribution and transformation of electric current for the purpose of detecting the existence of an electric potential or electric current in cables or other metallic conductors by means of a condenser and a Geissler tube.

According to the invention this purpose is attained by applying the metallic core of the cable or the other conductor as the outer covering or lining or plate of the condenser.

A still further object of the invention is a method for indicating the presence of an electric potential or electric current in a cable or other metallic conductor and preventing other cables or conductors situated at short distances from the cable or conductor to be tested influencing the apparatus.

Still another object of the invention is a portable apparatus for carrying out the said method.

This purpose is obtained according to the invention by shielding the inner covering or core of the condenser in such a way that only the cable or other conductor to be tested can influence the condenser.

In the accompanying drawing in which similar and corresponding parts are designated by the same characters of reference throughout the several views in which they appear.

Fig. 1 is a diagrammatic view illustrating the principle upon which the invention is based.

Fig. 2 a longitudinal section of one form of execution and

Fig. 3 a similar view of another form of execution.

With reference to Fig. 1 of the drawing, 1 indicates a tube filled with a noble gas as neon and 2 a condenser connected electrically to the tube. The outer electrode of the condenser may be brought into touch with a high voltage cable or conductor, whilst the outer electrode of the tube 1 is grounded. In this manner only very low voltage current will pass through the tube and in the neighborhood of the handle by which is held the assemblage comprising the condenser and tube, only current of very low voltage passes to the earth, so that the apparatus may be used without the slightest danger as parts with a dangerous voltage can not be touched.

In the form of execution shown in Fig. 2 the condenser consists in a rod 3 of insulating material and a central metallic core 4 connected with one end with the Geissler tube. The other electrode of the tube 1 is connected to a metal ring 5 of the handle by which the tube may be grounded. As soon as this apparatus approaches an electric cable or a conductor under voltage, the core of the cable or the conductor serves as the outer plate of the condenser and a current of very low voltage passes and energizes the tube 1 to the earth.

In switchboards, oil switches or such apparatus it usually occurs that potential or current must be indicated in one of a number of cables or conductors. In this event it is necessary to provide means in order to prevent other cables or conductors from also influencing the testing apparatus. In this case it is necessary to apply an apparatus as indicated in Fig. 3. This portable apparatus consists in a rod of insulating material 3, with a central rod 4 of metal, which rod is connected with one end to a gas tube 1, the other end of which tube is connected to a bolt or screw 8. The core 4 is for a part of its length surrounded by a metal tube 5', which tube 5' is also connected by a conductor 7 to the bolt 8. Opposite the tube a window is provided in the wall of the head of the rod 3 which window may be shut by a turnable ring 9 to protect the tube when the apparatus is not used. It is evident that a window is also provided in the ring 9, so that the ring 9 can be brought in a position, wherein the tube 1 can be observed from the outside. Near the end of the core 4 a metallic ring 6 may be fixed upon the insulating rod 3 in order to concentrate the action of the potential or current, to be indicated, upon the end of the core.

In order that the operation of the apparatus may be more readily understood, it is to be kept in mind that each conductor which touches the apparatus at a spot lying above the tube 5' and outside the boundaries of the rod 3, will induce a load therein, and if the nut 8 be grounded, this load is conducted by the wire 7 to the ground. If the nut 8 is not grounded, and the apparatus, provided with a handle similar to that shown in Fig. 2, be seized by a person, the apparatus is then grounded through the capacitance offered by the body of the person. Moreover the tube 5' has the action of a Faraday cage, so that the difference of potential between the tube 5' and the condenser plate 4 can never be sufficiently high to energize the neon tube 1 to the point where it will emit light.

By this method and apparatus it is possible to test cables or conductors situated in the neighbourhood of each other or of cables or conductors, which cannot be tested without passing other cables or conductors.

Having thus described my invention what I claim as new and desire to secure by United States Letters Patent is:

1. As a new article of manufacture, an apparatus for indicating the presence of potential or current in a cable or other metallic conductor consisting in a rod of insulating material with a central metallic core embedded therein entirely within the confines of the rod and extending over only a part of the length thereof, the metallic core being electrically connected with a gas or Geissler tube adapted to be grounded.

2. Apparatus for indicating the presence of potential or current in one of a number of cables or other metallic conductors mounted in the neighbourhood of each other, consisting in a rod of insulating material with a central metallic core extending over only a part of the length of the insulating rod and electrically connected at one of its ends with a gas or Geissler tube adapted to be grounded, the metallic core being surrounded over a part of its length and at some distance by a metallic tube also adapted to be grounded.

3. Apparatus according to claim 1, characterized by the fact that a metallic ring is mounted upon the insulating rod near the end of the metallic core.

4. Apparatus according to claim 2, characterized by the fact that a metallic ring is fixed upon the insulating rod about the end of the metallic core.

5. A portable apparatus for indicating the presence of potential or current in one of a plurality of separate cables or other metallic conductors mounted in the neighborhood of each other, comprising in combination with the particular cable to be tested, a base member comprised of insulating material; a condenser plate in said member; a gas tube cooperating with said base member, one terminal of said tube being adapted to be grounded, and the other terminal thereof being electrically connected to the said condenser plate; a conducting cylinder adapted to be grounded, surrounding said condenser plate over at least part of its length, thus assuring that only a selecting part of the condenser plate is influenced by the cable or other conductor to be tested; the other plate of the condenser being comprised of the cable to be tested, upon contact therewith by the said base member.

6. An apparatus for indicating the presence of potential or current in one of a plurality of cables or other metallic conductors mounted in the neighborhood of each other, comprising a rod of insulating material; a condenser plate extending through the greater part of the length of the said rod; a cylindrical metallic member adapted to be grounded and also embedded in said rod and extending about the said condenser plate at a distance therefrom along only a portion of the length thereof; a gas or Geissler tube also adapted to be grounded, the outer end of the said tube being electrically connected to the outer end of the metallic member; and a metallic ring fixed upon the exterior of the said rod near the end of the metallic member of the condenser to concentrate the action of the potential upon that portion of the apparatus.

7. Apparatus according to claim 2 characterized by the fact that the end of the metallic tube to be grounded is connected to the end of the gas tube also to be grounded.

In testimony whereof I have signed my name to this specification.

HENDRIK AREND HIDDE NIJLAND.